US012633313B2

(12) United States Patent
Aneja et al.

(10) Patent No.: US 12,633,313 B2
(45) Date of Patent: May 19, 2026

(54) SCRIPT BASED VIDEO EFFECTS FOR LIVE VIDEO

(71) Applicant: ADOBE INC., San Jose, CA (US)

(72) Inventors: Deepali Aneja, Seattle, WA (US); Kazi Rubaiat Habib, Seattle, WA (US); Li-Yi Wei, Redwood City, CA (US); Wilmot Wei-Mau Li, Seattle, WA (US); Stephen Joseph Diverdi, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 109 days.

(21) Appl. No.: 18/346,051

(22) Filed: Jun. 30, 2023

(65) Prior Publication Data

US 2025/0006226 A1     Jan. 2, 2025

(51) Int. Cl.
| | |
|---|---|
| *G11B 27/02* | (2006.01) |
| *G06F 40/35* | (2020.01) |
| *H04N 5/222* | (2006.01) |
| *H04N 5/278* | (2006.01) |

(52) U.S. Cl.
CPC .............. *G11B 27/02* (2013.01); *G06F 40/35* (2020.01); *H04N 5/2222* (2013.01); *H04N 5/278* (2013.01)

(58) Field of Classification Search
CPC ....... G11B 27/02; G06F 40/35; H04N 5/2222; H04N 5/278

USPC .......................................................... 386/280
See application file for complete search history.

(56) References Cited

U.S. PATENT DOCUMENTS

| | | | | |
|---|---|---|---|---|
| 8,286,202 | B2 * | 10/2012 | Newell ............ | H04N 21/42203 |
| | | | | 725/12 |
| 9,478,059 | B2 * | 10/2016 | Terry ...................... | G06T 13/40 |
| 10,546,409 | B1 * | 1/2020 | Subramonyam ........ | G06F 3/167 |
| 11,024,295 | B2 * | 6/2021 | Schmidt .................. | G10L 15/22 |
| 11,163,864 | B2 * | 11/2021 | Lim ......................... | G06F 21/32 |
| 2003/0046071 | A1 * | 3/2003 | Wyman ................... | G10L 15/22 |
| | | | | 704/E15.04 |
| 2006/0187336 | A1 * | 8/2006 | Rosenberg ............ | A63F 13/215 |
| | | | | 348/370 |
| 2018/0032611 | A1 * | 2/2018 | Cameron .............. | G06F 16/685 |
| 2020/0051302 | A1 | 2/2020 | Subramonyam et al. | |

OTHER PUBLICATIONS

Office action received for GB Patent Application No. 2406057.6, mailed on Sep. 20, 2024, 6 pages.

* cited by examiner

*Primary Examiner* — Helen Shibru
(74) *Attorney, Agent, or Firm* — Shook, Hardy & Bacon L.L.P.

(57) ABSTRACT

In various examples, a video effect is displayed in a live video stream in response to determining a portion of an audio stream of the live video stream that corresponds to a text segment of a script associated with the video effect. For example, during presentation of the script, the audio stream is obtained to determine if a portion of the audio stream corresponds to the text segment.

20 Claims, 9 Drawing Sheets

600

RECEIVE SCRIPT INPUT 602

RECEIVE INPUT SELECTION IDENTIFYING TEXT SEGMENT WITHIN SCRIPT 604

RECEIVE INPUT SELECTION IDENTIFYING VIDEO EFFECT 606

ASSOCIATE VIDEO EFFECT WITH TEXT SEGMENT 608

GENERATE SCRIPT INDEX 610

STORE SCRIPT INDEX 612

SCRIPT BASED VIDEO EFFECTS FOR LIVE VIDEO

BACKGROUND

Recent years have seen a proliferation in the use of video, which has applications in practically every industry, from film and television to advertising and social media. Businesses and individuals routinely create and share video content in various contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through multiple outlets. Indeed, recent advancements in digital cameras, smartphones, social media, and other technologies have provided many new ways that make it easier for even novices to capture and share a video. With these new ways to capture and share video comes an increasing demand for video editing features during live performances.

SUMMARY

Embodiments described herein are directed to providing visualizations and/or video effects for live video performances. For example, an application provides a script authoring interface and presentation interface which, in combination, allow a user to generate visualizations and/or video effects and cause display of the visualizations and/or video effects during presentation. In various examples, users are provided with a script authoring interface that allows a user to generate a script and apply visualizations and/or video effects to portions of the script. In particular, in such examples, the user selects portions of the script (e.g., words, sentences, paragraphs, etc. . . . ) and selects visualizations and/or video effects to be applied to a video during a presentation (e.g., text overlays, animations, etc. . . . ). A presentation user interface allows the users, in such examples, to perform the script and generates a video of the users' performance including the visualizations and/or video effects when the users perform the corresponding portions of the script. In one example, a set of triggers are generated and associated with portions of the script and particular visualizations and/or video effects, in turn during presentation, script following is performed to track the progression in the script and detect the set of triggers.

In various examples, in order to track a user's presentations in real-time (e.g., during live performances), an application providing the script authoring interface generates a data structure (e.g., key-value data store) storing words of the script and corresponding locations within the script. Continuing these examples, the words in the script are associated with keys (e.g., zero, one, two, etc. . . . ) corresponding to locations in the script and the value associated with the keys are the words in the script. In this manner, the keys of the data structure correspond to the sequence (e.g., location) of the word (e.g., value) in the script.

Turning to presentation of the script, in an example, a script location prediction model obtains the script and a transcript of an audio stream of the user presentation and generates a sequence of probabilistic locations within the script based on the transcript of the audio stream. In this example, a script advancer obtains the output of the script location prediction model and advances a cursor location within the script for a teleprompter presented to the user in the presentation user interface. Once the script advancer advances the cursor location to a trigger, the corresponding visualization and/or video effect is displayed within the video of the user's performance. As such, the systems and methods described are capable of providing visualizations and/or video effects during live presentations captured by a video recording device.

BRIEF DESCRIPTION OF THE DRAWINGS

The present invention is described in detail below with reference to the attached drawing figures, wherein.

DETAILED DESCRIPTION

Figure 1:
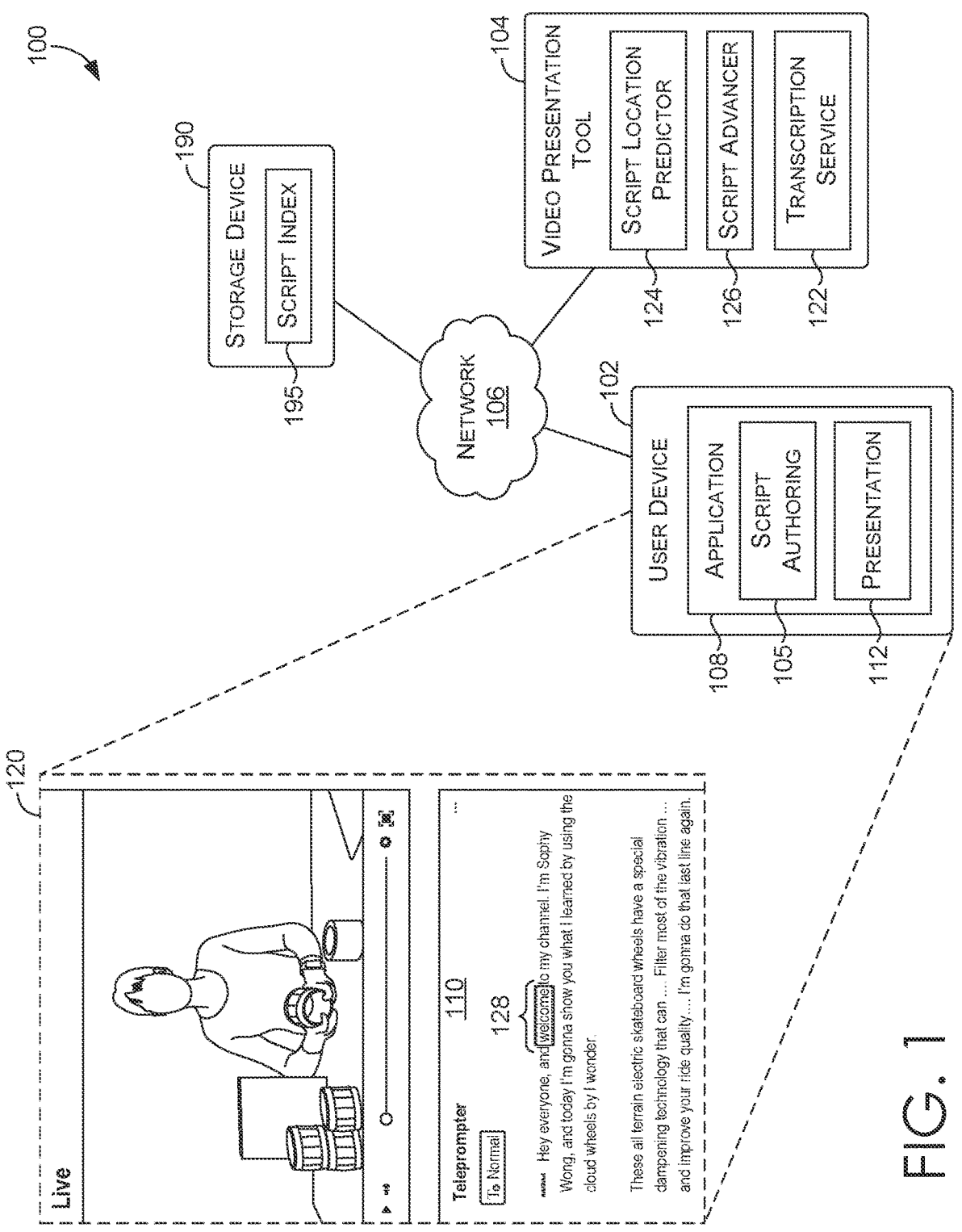
FIG. 1 depicts an environment in which one or more embodiments of the present disclosure can be practiced.

Embodiments described herein generally relate to providing visualizations and/or video effects for live video performances. In accordance with some aspects, the systems and methods described are directed to providing users with a script authoring interface that allows a user to generate a script and apply visualizations and/or video effects to portions of the script (e.g., text segments of the script). In particular, in one embodiment, the user selects portions of the script (e.g., words, sentences, etc. . . . ) and selects visualizations and/or video effects to be applied to a video during a presentation. For example, the user can select a text segment to be overlaid within an area of the video when the trigger is detected (e.g., the words of the text segment are spoken). In such examples, fonts, styles, layout, and other video effects can be applied or otherwise associated with the text segment such that, during presentation, when the trigger is detected the video effects are displayed in a video stream capturing the presentation (e.g., live video stream).

In various embodiments, a presentation interface allows the user to perform the script and generates a video stream of the user's performance including visualizations and/or video effects corresponding to the portions of the script selected by the user (e.g., the set of text segments and corresponding video effects). As in the example above, presentation triggers are generated and associated with portions of the script and particular visualizations and/or video effects during script authoring and, in turn during presentation, script following is performed to track the user's progression in the script and detect the presentation triggers. For example, an audio stream capturing the user's presentation is transcribed and location within the script is determined. In such examples, this process can be performed continuously and/or at various intervals (e.g., as the user speaks) and a script advancer can track a current location within the script. Furthermore, in various embodiments, during presentation, a teleprompter or other display indicates the current location within the script.

In an embodiment, during script authoring, an application providing the script authoring interface generates a script index which includes a data structure (e.g., key-value data store) indicating words of the script and corresponding locations. For example, the first word in the script is associated with a key (e.g., zero) corresponding to its location in the script and the value is stored as the word in the script. In this manner, the keys of the script index correspond to the location of the word (e.g., value) in the script, in various embodiments. In various examples, the script index enables tracking the current location of a presenter during presentation such that, when the presentation triggers are detected at the current location, the corresponding visualization and/or video effect can be displayed in the video stream. In one example, the script includes several occurrences of the word "onion"; however, only the first occurrence of the word is associated with a visualization of an image of an onion. In this example, the script index enables tracking of the current location within the script such that the occurrence of the word "onion" corresponding to the text segment in the script selected by the user during script authoring triggers the visualization.

Turning to the presentation of the script, in an embodiment, a script location prediction model obtains the script and the audio stream of the user's presentation and generates a sequence of probabilistic locations within the script based on the audio stream. In one example, the script advancer obtains the output of the script location prediction model and advances the current position within the script (e.g., advances the key within the script index to the next key corresponding to the next word in the script) for a teleprompter presented to the user in the presentation interface. In various embodiments, once the script advancer advances the current position to a trigger the corresponding visualization and/or video effect is displayed within the video of the user's performance.

Furthermore, in various embodiments, the script advancer handles errors from a transcription service and/or application providing the transcript corresponding to the audio stream. For example, the script advancer matches a plurality of words from the transcript to words in the script. In an embodiment, a sliding window including a number of words (e.g., three words) is compared between the transcription and the script, if the words within the sliding windows match, the current location is advanced. In other embodiments, the script advancer manages instances where the user deviates from the script during presentation. For example, if a match between the transcript and the script cannot be obtained for an interval of time, an indication that the user is "off script" can be presented. In addition, in an embodiment, the cadence of the speaker is monitored and a size or an amount of the script displayed in the teleprompter is increased or decreased. During presentation, in an embodiment, the teleprompter indicates the user's current location and displays visualizations and/or video effect, when triggered, in the video stream corresponding to the presentation visible to the user.

Aspects of the technology described herein provide a number of improvements over existing technologies. For instance, traditional video editing tools are expensive and complex, requiring that the user be trained to use generally complex user interfaces. To become adept, users of video editing must acquire an expert level of knowledge and training to master the processes and user interfaces for typical video editing systems. Additionally, these video editing tools often rely on selecting video frames or a corresponding time range. These video editing tools can be inherently slow and fine-grained, resulting in editing workflows that are often considered tedious, challenging, or even beyond the skill level of many users. In other words, timeline-based video editing that requires selecting video frames or time ranges provides an interaction modality with limited flexibility, limiting the efficiency with which users interact with conventional video editing interfaces. Embodiments of the present disclosure overcome the above, and other problems, by providing mechanisms for applying visualization and/or video effect to presentation of live video without the need for traditional frame by frame video editing.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 9.

It should be understood that operating environment 100 shown in FIG. 1 is an example of one suitable operating environment. Among other components not shown, operating environment 100 includes a user device 102, video presentation tool 104, and a network 106. Each of the components shown in FIG. 1 can be implemented via any type of computing device, such as one or more computing devices 900 described in connection with FIG. 9, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the video presentation tool 104 includes multiple server computer systems cooperating in a distributed environment to perform the operations described in the present disclosure.

User device 102 can be any type of computing device capable of being operated by an entity (e.g., individual or organization) and obtains data from knowledge distillation tool 104 and/or a data store which can be facilitated by the video presentation tool 104 (e.g., a server operating as a frontend for the data store). The user device 102, in various embodiments, has access to or otherwise maintains a storage device 190 which stores a script index 195 and/or visualizations and/or video effects to be applied to a video during a presentation (e.g., live performance of a script by a user using the user device 102). For example, the application 108 includes a video editing application to enable script editing, video editing, real-time previews, playback, and video presentations including visualizations and/or video effects, such as a standalone application, a mobile application, a web application, and/or the like.

In various embodiments, to enable these operations the application 108 includes script authoring 105 user interface or other component and a presentation 112 user interface or other component. For example, the script authoring 105 user interface enables the user to generate text for a script and select text segments to associate with visualizations and/or video effects as described in greater detail below in connection with FIG. 2. In another example, the presentation 112 user interface enables the user to perform or otherwise present the script in a video stream or other live performance including the visualizations and/or video effects as described in greater detail below in connection with FIGS. 3 and 4. Although some embodiments are described with respect to the script authoring 105 user interface and the presentation 112 user interface, some embodiments implement aspects of the present techniques in other types of applications and/or additional applications, such as those involving text-based video editing, transcript processing, visualization, and/or interaction.

In some implementations, user device 102 is the type of computing device described in connection with FIG. 9. By way of example and not limitation, the user device 102 can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the user device 102 and the video presentation tool 104. For example, the application 108 obtains a transcript of an audio stream corresponding to a video stream from a transcription service 122 of the video presentation tool 104. In yet other examples, the application 108 obtains information indicating a location within the script from a script location predictor 124 and/or a script advancer 126. In some implementations, the application 108 comprises a web application, which can run in a web browser, and can be hosted at least partially on the server-side of the operating environment 100. In addition, or instead, the application 108 can comprise a dedicated application, such as an application being supported by the user device 102, the video presentation tool 104, and/or the storage device 190 (e.g., a remote storage device hosted by a computing resource service provider). In some cases, the application 108 is integrated into the operating system (e.g., as a service). It is therefore contemplated herein that "application" be interpreted broadly. Some example applications include ADOBE® SIGN, a cloud-based e-signature service, and ADOBE ACROBAT®, which allows users to view, create, manipulate, print, and manage documents.

For cloud-based implementations, for example, the application 108 is utilized to interface with the functionality implemented by the video presentation tool 104. In some embodiments, the components, or portions thereof, of the video presentation tool 104 are implemented on the user device 102 or other systems or devices. Thus, it should be appreciated that the video presentation tool 104, in some embodiments, is provided via multiple devices arranged in a distributed environment that collectively provide the functionality described herein. Additionally, other components not shown can also be included within the distributed environment.

As illustrated in FIG. 1, the user device 102 provides a user with a user interface 120 to enable the user to perform script authoring 105 (e.g., via the user interface 120) and/or presentation 112 (e.g., via the user interface 120). For example, the user can generate a script through the script authoring 105 user interface and associate visualizations and/or video effects with text segments of the script, the video presentation tool 104 or other application (e.g., the application 108), then generate a script index 195 corresponding to the script which enables display of the visualizations and/or video effects during presentation 112 of the script based on detecting the text segments corresponding to the visualizations and/or video effects in a transcript (e.g., a conversion of audio to text). Furthermore, in some embodiments, the script index 195 and/or visualizations and/or video effects are stored in the storage device 190. In an example, the storage device 190 includes one or more computer readable media.

In various embodiments, the user device 102 is a desktop, laptop, or mobile device such as a tablet or smartphone, and the application 108 provides one or more user interfaces including the user interface 120. In some embodiments, the user accesses the script through the script authoring 105 user interface of the application 108, and/or otherwise uses the application 108 to identify the location where the script is stored (whether local to the user device 102, at some remote location such as the storage device 190, or otherwise stored in a location accessible over the network 106). For example, the user, using an input device such as a keyboard, provides inputs to the application to generate the text of the script. Furthermore, in such examples, the user then selects, through the user interface 120, text segments (e.g., letters, words, sentences, paragraphs, etc.) of the script and indicates visualizations and/or video effects to be applied during the presentation 112.

Additionally, or alternatively, in various embodiments, the user accesses the presentation 112 user interface of the application 108 and records a video using video recording capabilities of the user device 102 (or some other device) and/or some application executing at least partially on the user device 102. For example, the user through the user interface 120 initiates recording of the video and performs the script (e.g., text displayed in a teleprompter 110), audio corresponding to the video is provided to the video presentation tool 104. In this example, the video presentation tool 104 causes the transcription service 122 to generated a transcript (e.g., by at least converting the audio to text using one or more machine learning models) and, based on the transcript, determines a location (e.g., a word and/or text segment in the script corresponding to words spoken by the user). Further continuing this example, the video presentation tool 104 determines the location using the script location predictor 124 and advances a cursor within the user interface 120 indicating the location using the script advancer 126.

As described in more detail below, in various embodiments, the application 108 performs video edits and/or otherwise apply visualizations and/or video effects in response to the video presentation tool 104 or other application detecting a trigger associated with a text segment the user applied a visualization and/or a video effect to. For example, the video effects are applied to a live video stream through the selection of words, phrases, or text segments from the script and applying text stylizations or layouts to the word selection which are stored in the storage device. In an embodiment, the text stylizations or layouts correspond to video effects and/or effect types. For example, the text stylizations include text to overlay on the video and display information such as font, size, style, animation, or other attributes to apply during presentation. In other examples, layouts indicate position and/or orientation of visualizations (e.g., images, animations, etc.) and/or video effects with the video. In an embodiment, the application 105 applies selected video effects to a segment of the video such that when the video is displayed (e.g., streamed to another user device) at the time when the selected word, phrase, or text segment is spoken, the video effect will also appear.

In some embodiments, after presentation 112 of the video is completed and the intended visualizations and/or video effects have been applied, the user can save or otherwise export the video generated during presentation 112 to another application such as video editing application. In other embodiments, the application 108 produces a video of the presentation including the visualizations and/or video effects without the need for post-processing.

In various embodiments, the application 108 generates the script index 195 based on the script generated during script authoring 105. In one example, the script authoring 105 user interface includes a "save" button that, when interacted with by the user, causes the application 108 to generate the script index 195. In an embodiment, the script index 195 includes a data structure that stores the script and is used by the video presentation tool 104 to rack or otherwise monitor a location within the script and cause the visualizations and/or video effects to be applied to the video during presentation 112. In one example, the script index 195 includes a key-value store where the keys correspond to the location (e.g., the sequence of words in the script) and the values correspond to the words in the script. Turning to the example, illustrated in FIG. 1, the first word of the script displayed in the user interface 120 "Hey" is assigned the key "0" in the script index 195, the next word of the script "everyone" is assigned the key "1" in the script index, and the process continues to increment the keys (e.g., the numerical value of the key) for the remaining words in the script. Although the example above defines keys sequentially starting from zero, other values (e.g., alphanumeric, hexadecimal, etc.) and order can be used in connection with the embodiments described.

As described in detail below, in various embodiments, the keys of the script index 195 are used by the script advancer 126 to indicate the location within the script. Furthermore, in an embodiment, the script advancer 126 updated the location within the script, based on information from the script location predictor 124, by at least indicating a new key within the script index 195 as the current location. In addition, based on the location indicated by the script advancer 126, the application 102 or other component illustrated in FIG. 1, in various embodiments, determines whether the location is associated with a trigger for displaying a visualization and/or video effect based on the value stored in the script index 195 corresponding to the key indicated by the current location. Turning to the example, illustrated in FIG. 1, as a result of the script advancer 126 indicating the location corresponding to the second word in the script "everyone" (e.g., the key "1" described above), the application 108 determines if a visualization and/or video effect is associated with the key and/or value stored in the script index 195.

In various embodiments, the script location predictor 124 include a machine learning model that obtains the script (e.g., from the script index 195 and/or storage device 190) and a transcript (e.g., text generated by the transcription service 122) of the audio generated and/or captured during the presentation 112 and generates a sequence of probabilistic locations within the script based on the transcript of the audio stream. For example, the script advancer 126 obtains the output of the script location predictor 126 and advances a cursor location 128 within the script index 195 for display on the teleprompter 110 presented in the user interface 120. For example, as illustrated in FIG. 1, the cursor location 128 includes highlighting or other visual indicating of the location within the script determined by the video presentation tool 104 or component thereof such as the script advancer 126.

In various embodiments, the script location predictor 124 matches a plurality of words from transcript to a plurality of words from the script. For example, a sliding window of three words is used by the script location predictor 124 to determine the location within the script and cause the script advancer 126 to advance the location within the script. In the example illustrated in FIG. 1, the script location predictor 124 obtains text from the transcription service 122 (e.g., text converted from the audio of the presentation 112) and matches the text to "everyone, and welcome" obtained from the script, once the three consecutive words are matched, the script advancer 126 updates the cursor location 128. In an embodiment, the script advancer 126 determines the key from the script index 195 associated with the word matched between the text obtained from the transcription service 122 with the script and sets the cursor location 128 to the key. In other embodiments, the script advancer 126 increments a value corresponding to the key from the script index 195 in response to matching text obtained from the transcription service 122 with the script in order to advance the cursor location 128.

In various embodiments, the transcription service 122 identifies words in an audio file and/or audio stream. In one example, the transcription service 122 includes one or more machine learning models that convert audio to text. In an embodiment, the transcription service 122 includes a first machine learning model that generates text from audio based on words spoken in the audio and a second machine learning model that modifies the text based on context information obtained from previously generated text from the first machine learning model. For example, as the user speaks the second machine learning models modifies the output of the first machine learning model based on context information determined from the output of the first machine learning model.

Figure 2:
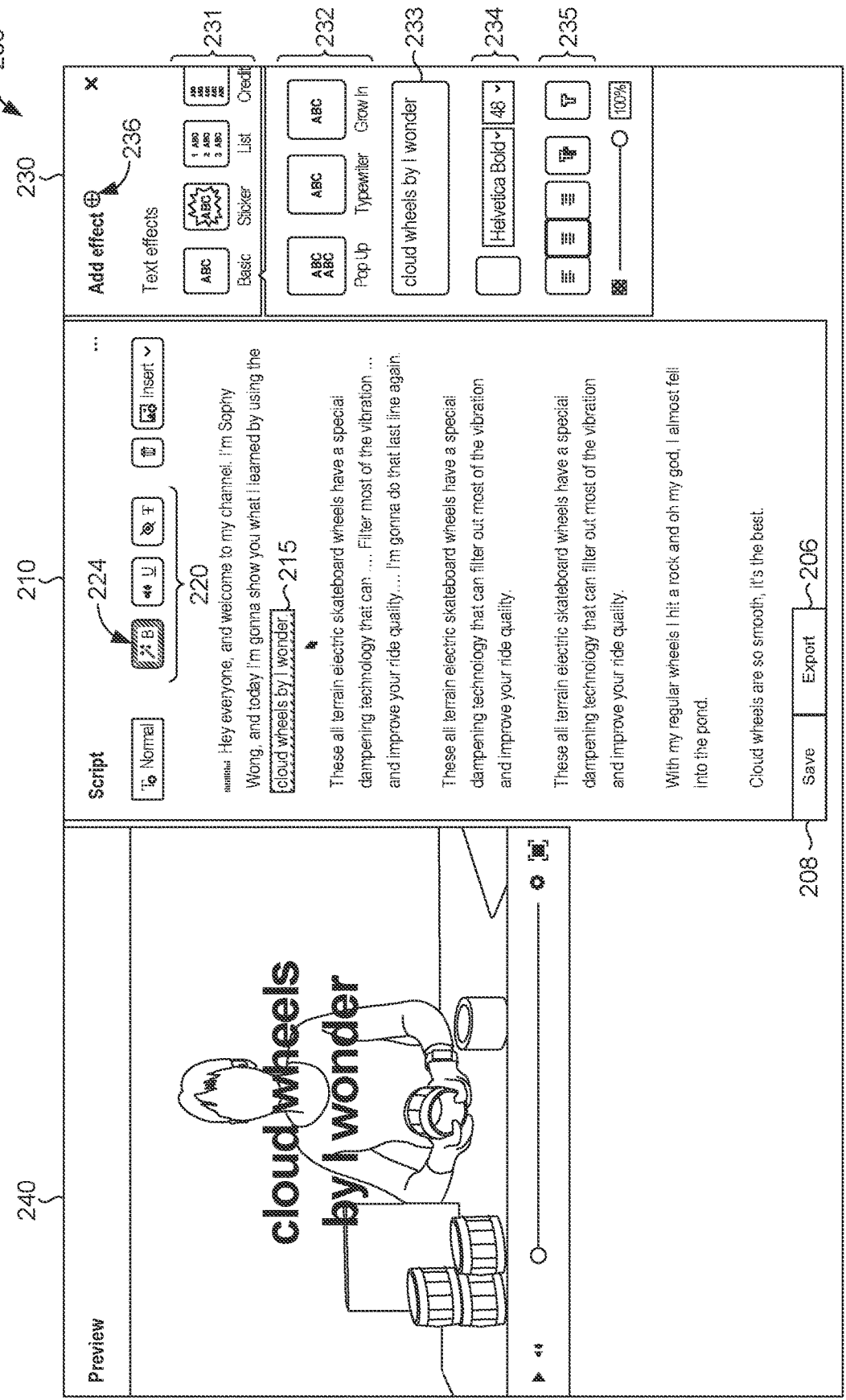
FIG. 2 depicts a user interface of an application including a script authoring interface which is provided to a user, in accordance with at least one embodiment.

FIG. 2 depicts a user interface 200 of an application including a script authoring interface 210 which is provided to a user, in accordance with at least one embodiment. FIGS. 2-5 depict user interfaces 200-500 that are generated by an application, such as the application 108 as described above in connection with FIG. 1. In some embodiments, the user interfaces 200-500 are generated at least in part by other applications. For example, a preview panel 240 of the user interface 200 includes a video preview which can be generated at least in part by a video capture application or other application that provides data to the application 108. In addition, in some embodiments, data or other information displayed in the user interfaces 200-500 are obtained from other applications and/or devices including remote applications, services, and devices. In one example, a video effects panel 230 of the user interface 200 displays a set of video effects that can be applied to a video during presentation which are obtained from a video effect service of a computing resource service provider. Furthermore, in various embodiments, additional panels or graphical user interface element are included in the user interfaces 200-500 to provide users with additional functionality. For example, a sound effects panel can be included in the user interface 200. Fewer or additional panels or graphical user interface element can be included in the user interfaces 200-500 in various embodiments.

In various embodiments, the user interface 200 includes the script authoring interface 210, a text stylization panel 220, the video effects panel 230, and the preview panel 240. In various embodiments, the script authoring interface 210 provide an interface for creating, editing, saving, exporting, deleting, or otherwise generating a script for presentation. In the example illustrated in FIG. 2, the script authoring interface 210 provide text generating and modification features such as word processing. In an embodiment, the script authoring interface 210 includes a "Save" graphical user interface element 208 that, as a result of being selected or otherwise being interacted with by the user, causes the application to save the script and an "Export" graphical user interface element 206 that, as a result of being selected or otherwise being interacted with by the user, causes the application to export the script. In various embodiments, the text stylization panel 220 presents various stylization options that can be applied to text segments in the transcript and the preview panel 240 provides a preview of the video and displays applied effects In various embodiments, the script authoring interface 210 presents at least a portion of the script and allows the user to highlight or otherwise select a text segment 215 and select a text stylization, a video effect, audio effect, animation, transition, image, overlay, or other graphical or non-graphical effect. In the example illustrated in FIG. 2, the text segment 215 is displayed with an applied bold text stylization. For example, the bold text stylization button 224 is highlighted as an indication that it is selected and applied to the text segment 215. As a result, in such examples, the application stores information indicating the selected video effects and the text segment 215 such that, during presentation, when the video presentation tool detects the text segment 215 the corresponding video effect is displayed.

In some embodiments, the bold text stylization is mapped to a default video effect that is applied to when the text segment 215 is selected. Furthermore, in various embodiments, aspects and/or attributes of the video effect to be applied to the text segment 215 during presentation can be selected by the user and/or modified. For instance, as shown in the example of FIG. 2, upon selection of the bold text stylization button 224, the video effects panel 230 provides and displays corresponding video effect options (e.g., options for modifying attributes) associated with the bold text stylization. In one example, attributes include text effect options for a video effect that overlays text on the video. In an embodiment, the text effect options include a text appearance option 231, a text visual option 232, a text window 233 for providing the text overlay, and text stylization, and/or layout options 234, 235.

Additionally, in various embodiments, the video effects panel 230 provides an add effect button 236 that provides a mechanism for adding multiple video effects to the test segment 215 during presentation and associating those video effects with an applied text stylization (e.g., bold text stylization). For example, when an add effect graphical user interface element 236 is pressed, a second text overlay visualization or other video effect is added to the video when the highlighted text 215 "cloud wheels by I wonder" is spoken during presentation. In this example, multiple visualizations and/or video effects are tied to a single trigger (e.g., the text segment 215).

As illustrated in the example in FIG. 2, the text "cloud wheel by I wonder" appears as an overlay in the preview pane 240 demonstrating to the user the appearance of the visualization and/or video effect when the text segment 215 is spoken during presentation. In some embodiments, the text effect options selected in the video effects panel 230 are applied to the text as it is presented on the video to provide additional video effect visualizations to the text overlay. It should be noted that the text effect options 231, 232, 233, 234, and 235 are for exemplary purposes only, and that other video effect options are also visualizable and providable.

In various embodiments, the text stylization panel 220 provides various text stylizations, formats, and/or layout commands that are mappable to a particular video effect and/or video effect type. For instance, in this illustration, the text stylization panel 220 includes the text bolding stylization button 224 mapped to a visual effect type, an underline button mapped to an audio effect type, and a strikethrough stylization button mapped to a video masking effect type.

Figure 3:
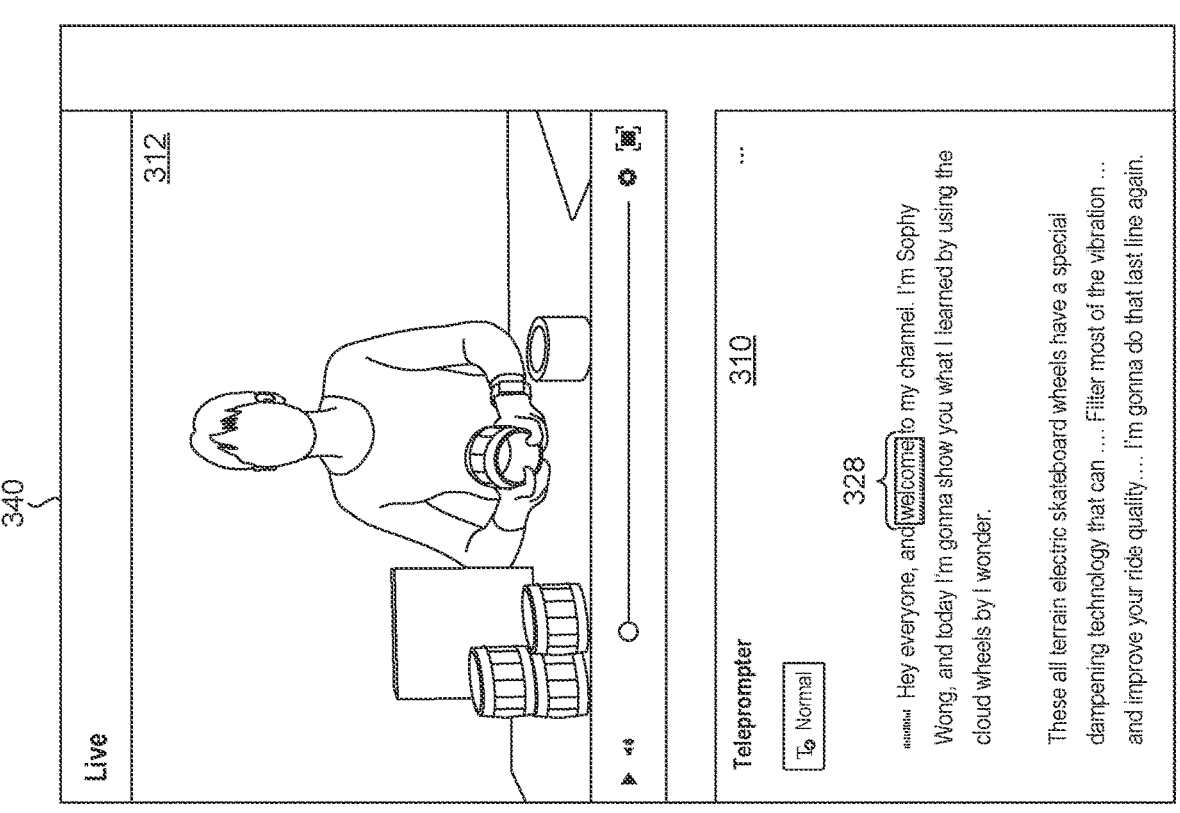
FIG. 3 depicts a user interface of an application including a presentation interface which is provided to a user, in accordance with at least one embodiment.

FIG. 3 illustrates a user interface 300 of an application including a presentation interface 340 which is provided to a user, in accordance with embodiments of the present disclosure. In various embodiments, the user interface 300 is a continuation of a script authoring process as described in FIG. 2. For example, once the script and video effects are provided by the user via the user interface 200, the user can initiate the presentation interface 340 in order to perform or otherwise present the script. In an embodiment, the user interface 300 includes a teleprompter 310, a cursor location 328, and a video playback region 312. In one example, the teleprompter 310 presents a visualization of the script, the cursor location provides visual indication of the user's current location within the script, and the video playback region 340 displays video captured, using a video camera or suitable recording device, of the user during presentation.

In various embodiments, the teleprompter 310 displays the script or a portion thereof and displays the cursor location 328. In an example, as the user reads the script audio is captured of the user's presentation and, as described above, the script location predictor of the video presentation tool determines the corresponding location within the script. Continuing this example, the script advancer advances the cursor location 328 in the teleprompter 310.

Figure 4:
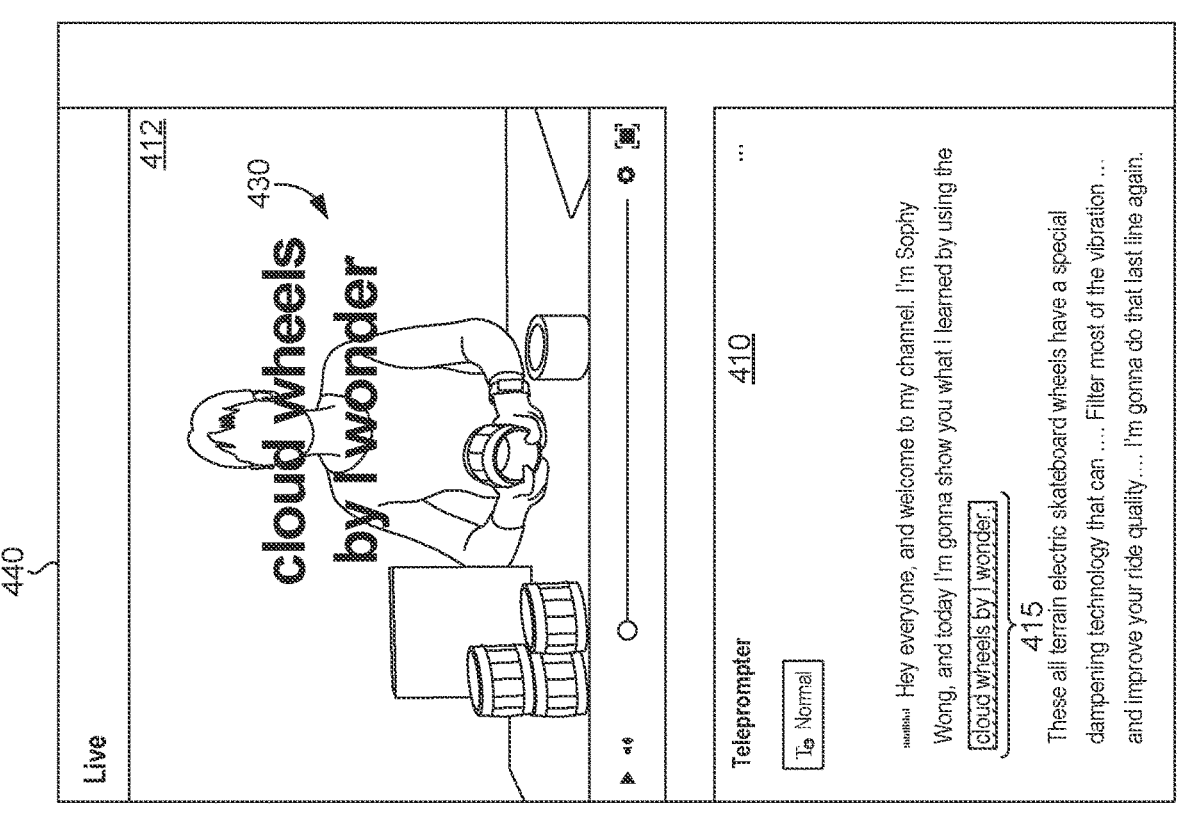
FIG. 4 depicts a user interface of an application including a presentation interface which is provided to a user, in accordance with at least one embodiment.

FIG. 4 illustrates a user interface 400 of an application including a presentation interface 440 which is provided to a user, in accordance with embodiments of the present disclosure. In various embodiments, the user interface 400 is a continuation of the presentation interface as described in FIG. 3. For example, the user can present a script using the user interface 400 including a teleprompter 410 and a video playback region 412. Furthermore, in various embodiments, a video effect 430 is displayed in the video playback region 412. For example, the video effect 430 is displayed in the video playback region 412 as a result of the video presentation tool or component thereof (e.g., script advancer) detecting a text segment 415 associated with the video effect 430 (e.g., detecting a trigger for the video effect 430).

In an embodiment, the teleprompter 410 presents a portion of the script that includes the text segment 415 (e.g., a text segment selected by the user to trigger display of the video effect 430) with the video effect 430 (e.g., a default video effect or a video effect selected from the video effects panel 330) to be applied. For example, when a portion of a transcript generated from audio of the presentation is matched with the text segment 415, the application displaying the user interface 400 causes the video effect to be displayed. In some embodiments, the video effect 430 includes an audio effect for an audio track that plays concurrently with the audio track associated with the video (e.g., the video captured of the presentation). For example, the audio effect includes various audio adjustments, music, audio scenery, and/or additional audio effects that can be played during the presentation.

In the example illustrated in FIG. 4, the video effect 430 includes a text overlay of the text segment which include text stylization and layout. In other embodiments, the video effect 430 includes other effects such as animations, video, images, transitions, wipes, filters, or any other effect or alteration that can be applied to video. Furthermore, in various embodiments, the video effects 430 are not displayed in the video playback pane 412. For example, the video of the presentation can be streamed to one or more remote computer systems and the video effect 430 can be applied to the video stream without being displayed locally in the video playback pane 412.

As mentioned above, in some embodiments, multiple video effects can be associated with the text segment 415 or a portion thereof. For example, the word "wonder" in the text segment 415 can be associated with a second video effect. In another example, within the highlighted text segment 415, another text segment includes an additional text stylization or layout (e.g., boldface) such that different stylizations can be applied to different words within the text segment 415. The additional text stylization or layout, in an embodiment, indicates that at least one other video effect is applied to the text segment. During presentation, for example, when the text segment is spoken, the underlined text stylization indicates that the selected video effect is applied, and the boldface text stylization indicates that another video effect is also applied.

Figure 5:
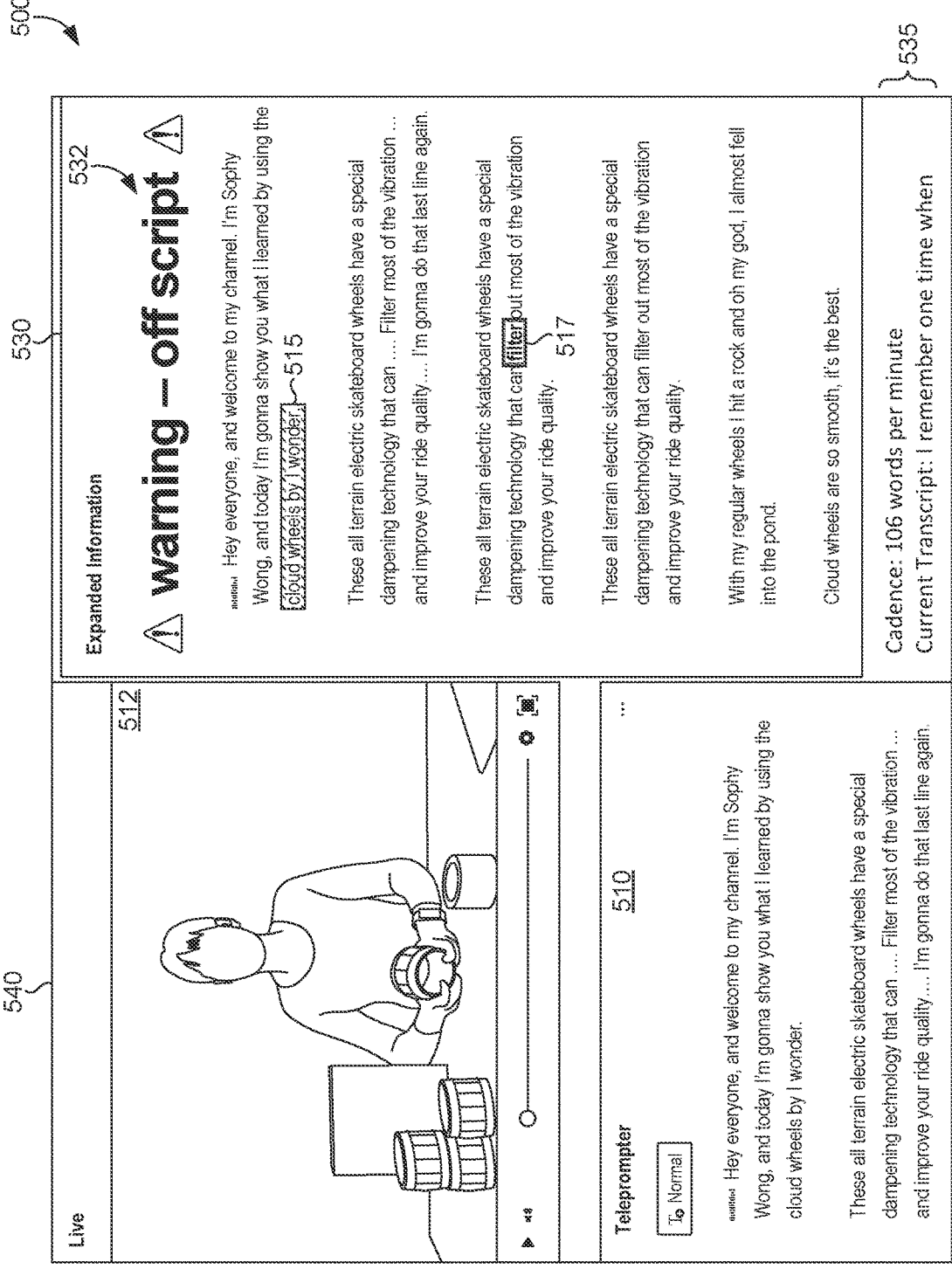
FIG. 5 depicts a user interface of an application including a presentation interface which is provided to a user, in accordance with at least one embodiment.

FIG. 5 illustrates a user interface 500 of an application including a presentation interface 540 which is provided to a user, in accordance with embodiments of the present disclosure. In various embodiments, the user interface 500 is a continuation of the presentation interface as described in FIGS. 3 and/or 4. For example, an expanded information panel 530 is displayed in the user interface 500 to provide additional information to the user during presentation. In an embodiment, the user interface 500 includes a teleprompter 510 to display at least a portion of a script, a video playback region 512 to display video captured during the presentation, and the expanded information panel 530. The expanded information panel 530, for example, displays additional information to the user such as a script warning 532, a first text segment 515, a second text segment 517, and presentation information 535.

In various embodiments, the expanded information panel 530 displays information to the user during the presentation, the displayed information is determined or otherwise obtained from the video presentation tool 104 as described above in connection with FIG. 1. For example, the video presentation tool processes delays from a transcription service when determining what words are being spoken by the user during the presentation. In various embodiment, a script advancer maintains a cursor location in a script index and uses a sliding window (e.g., a plurality of consecutive words in the script) to check for matches in the script and advances the cursor location when a match is detected. In one example, the presentation information 535 includes a stream of text (e.g., "I remember one time when") obtained from the transcription service which is converted from audio captured during the presentation.

Furthermore, in some embodiments, the transcription service performs sentence tokenization to determine words spoken by the user when detecting matches with words in the script. In one example, this includes cleaning and tokenizing text to remove or otherwise process certain characters and/or words such as letter case, punctuation, numbers, special characters, symbols, etc. In addition, in an embodiment, the expanded information panel 530 displays the script index or other data structure (e.g., key value pair) used to store the script. As described above, in an example, the script index includes a set of keys corresponding to locations within the script and the value corresponding to the words in the script. In order to determine a match within the sliding window, for example, the video presentation tool or component thereof such as the script advancer, matches up to 5 words and then advances the cursor location in the index (e.g., modifies or otherwise changes the key associated with the cursor location).

In an embodiment, various parameters can be changed based on speaker cadence or application factors. For example, the presentation information 535 includes an indication of the speaker cadence (e.g., average number of words spoken during an interval of time). In various embodiments, the cadence information causes the application and/or video presentation tool to modify one or more parameters. For example, the presentation information 535 (e.g., the cadence information) can cause the video presentation tool to modify the size of the sliding window. In another example, the presentation information 535 can be used to modify conditions for determining or otherwise detecting trigger words (e.g., if a trigger word is detected in the last x (e.g., 3 words) words match with the script, display the corresponding video effect).

In addition, the expanded information panel 530, in an embodiment, includes the script warning 532 to indicate to the user (e.g., display in user interface 500) when they are off script. For example, the video presentation tool periodically or aperiodically checking for a match between the transcript and the script and displays the script warning 532 if no match has been detected after an interval of time (e.g., display the message "you have been off script for 30 seconds, no match has been found in this interval").

In an embodiment, continuous transcription of the user and updating of confidence values associated with the spoken words is performed during the presentation. In addition, in some embodiments, the script is parsed and uses the ground truth/target to match when performing transcription and/or determining the cursor location within the script. For example, as the user speaks during the presentation, the transcription service returns two strings (e.g., a stream of text): the recognizing string and the recognized string. In this example, the recognizing string includes words being spoken and the recognized string includes a sentence generated at intervals with context. In an embodiment, the video presentation tool matches individual words from the stream of text obtained from the transcription service (e.g., recognizing string) to words in the script index. In some examples, at the start of the script (e.g., the start of the presentation) the cursor location is set to zero and/or the first word of the script, and, as the user speaks, the video presentation tool tracks the stream of text from the transcription service and matches the words using the sliding window (e.g., the previous 3 words obtained) to determine a match. In these examples, once a match for those three words are obtained, the cursor location is advanced (e.g., the next word in the script/one position). In various embodiments, natural language processing is used to determine the word match. Furthermore, in various embodiments, the input to the video presentation tool includes the script and the stream of text spoken by the user, the video presentation tool then outputs a current location (e.g., cursor location) in the script and if the current location corresponds to a word which is a trigger (e.g., if it is a trigger then the video presentation tool causes the corresponding video effect to display).

Figure 6:
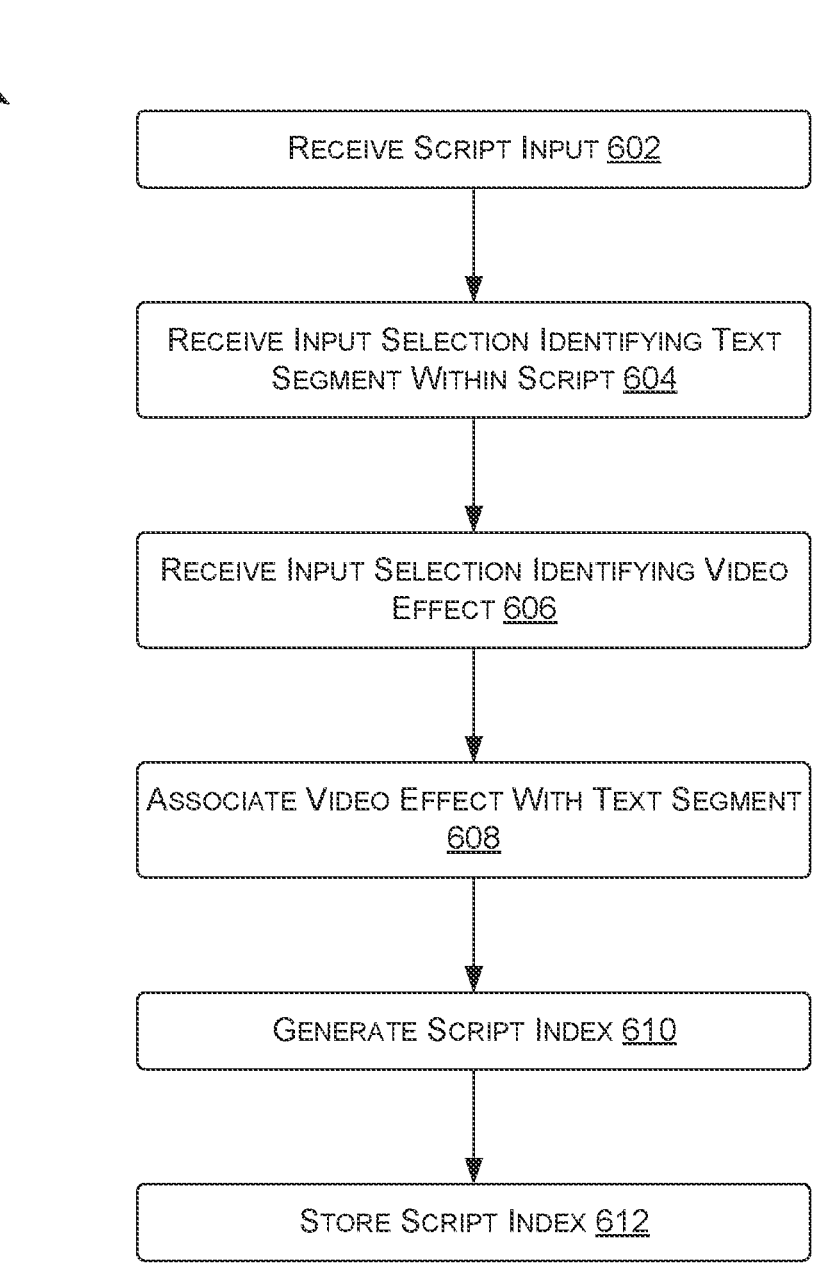
FIG. 6 depicts an example process flow for authoring a script including triggers for visual effects during presentations, in accordance with at least one embodiment.
Figure 7:
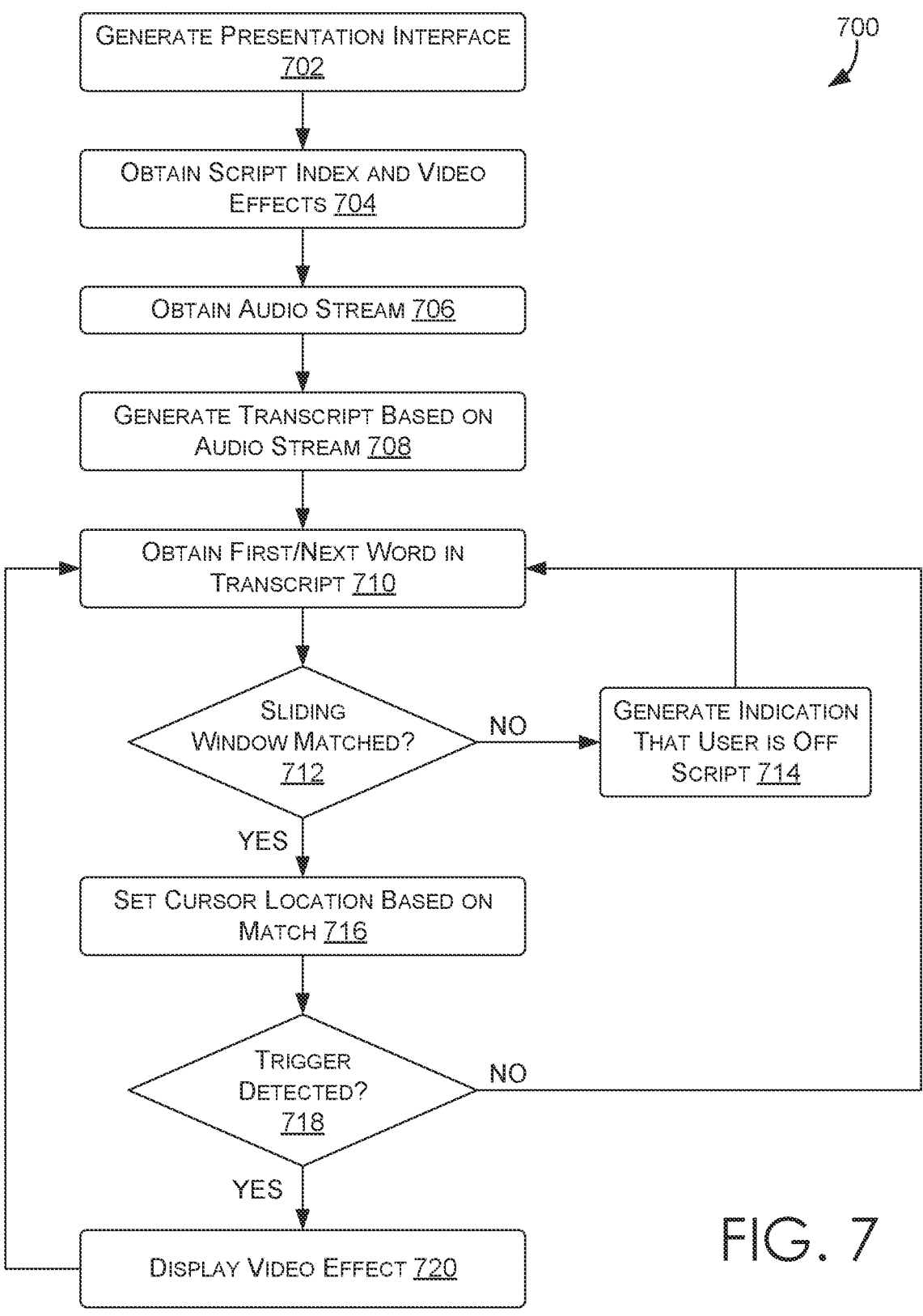
FIG. 7 depicts an example process flow for displaying video effects in a video during presentation of a script, in accordance with at least one embodiment.

FIG. 6 is a flow diagram showing a method 600 for authoring a script including triggers for visual effects during presentations in accordance with at least one embodiment. Referring now to FIGS. 6 and 7, the methods 600 and 700 can be performed, for instance, by the video presentation tool 104 of FIG. 1. Each block of the methods 600 and 700 and any other methods described herein comprise a computing process performed using any combination of hardware, firmware, and/or software. For instance, various functions can be carried out by a processor executing instructions stored in memory. The methods 600 and 700 can also be embodied as computer-usable instructions stored on computer storage media. The methods 600 and 700 can be provided by a standalone application, a service or hosted service (standalone or in combination with another hosted service), or a plug-in to another product, to name a few.

Returning to FIG. 6, as shown at block 602, the system implementing the method 600 receives a script input. As described above in connection with FIG. 1, in various embodiments, a script authoring interface is provided to a user to enable the user to generate a script. For example, the user can provide an input to the script including words or other text.

At block 604, the system implementing the method 600 receives an input selection identifying a text segment within the script. For example, the user can highlight a text segment within the script using a mouse or other input device. At block 606, the system implementing the method 600 receives an input selection identifying a video effect. In an example, the user selects from a set of video effects that can be applied to videos presenting the script. In various embodiments, the video effects include any effect, including audio effects that can be applied to videos. For example, the user can select various video effects using the script authoring interface 200 as described above in connection with FIG. 2.

At block 608, the system implementing the method 600 associates the video effect with the text segment. For example, the text segment or portion thereof (e.g., the first word of the text segment) is associated with a trigger that, once detected during presentation, causes the video effect to be displayed in a video of the presentation. At block 610, the system implementing the method 600 generates a script index based on the script. As described above, in various embodiments, the script index includes a key-value data structure where the keys correspond to locations within the script and the values correspond to words within the script. At block 612, the system implementing the method 600 stores the script index. For example, the script index is stored in a remote data store that is accessible to the video presentation tool.

FIG. 7 is a flow diagram showing a method 700 for displaying video effects in a video during presentation of a script in accordance with at least one embodiment. At block 702, the system implementing the method 700 generates a presentation interface. For example, the presentation interface can be displayed in a user interface such as the user interfaces 300-500 of FIGS. 3-5 as described above. In an embodiment, an application generates the presentation interface including a teleprompter to display the script and a video playback region to display video captured of the presentation.

At block 704, the system implementing the method 700 obtains the script index and video effects. For example, the user selects a previously saved script generated using the script authoring interface and the application obtains the corresponding script index and information indicating the video effects to be applied to text segments of the script. At block 706, the system implementing the method 700 obtains an audio stream of the presentation. For example, the computing device executing the application includes a microphone to capture audio of the user during the presentation.

At block 708, the system implementing the method 700 generates a transcript based on the audio stream. As described above, a transcription service converts the audio stream to text such as words spoken by the user. Furthermore, in various embodiments as described above, the transcript is generated continuously as the presentation interface is displayed. At block 710, the system implementing the method 700 obtains the first/next word in the transcript. For example, as the transcript service provides text the system implementing the method 700 obtains the text (e.g., words).

At block 712, the system implementing the method 700 determines if a sliding window is matched. In an embodiment, the video presentation tool matches a plurality of words in the script with text from the transcription service. In other embodiments, the sliding window is not used and words from the transcript are matched individually to the script. Returning to FIG. 7, if all or a portion of the words in the sliding window match between the transcript and the script, the system implementing the method 700 continues to block 716. However, if the sliding window is not matched, the system implementing the method 700 continues to block 714. At block 714, the system implementing the method 700 generates an indication that the user is off script. For example, a script warning can be displayed in the presentation interface as described above in connection with FIG. 5. The system implementing the method 700, then returns to block 710 to obtain the next word in the transcript.

At block 716, the system implementing the method 700 sets the cursor location based on the match. For example, a script advancer, after determining that there is a match between the words spoken by the user and the script, advances the cursor location by at least setting the cursor location to the key in the script index associated with the word matched in the script.

At block 718, the system implementing the method 700 determines whether a trigger is detected. For example, in the word corresponding to the cursor location is associated with a video effect selected by the user during script authoring. If the word is associated with a trigger, the system implementing the method 700 continues to block 720 and displays the video effect. For example, the application displays a text overlay in the video captured of the presentation. However, if the word is not associated with trigger, the system implementing the method 700 continues to block 710 and the method 700 continues. In various embodiments, the method 700 continues until presentation is ended. For example, until the user ends the presentation by selecting a graphical user interface element within the presentation interface.

Figure 8:
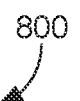
FIG. 8 is a block diagram of an example computing system for script authoring and presentation, in accordance with embodiments of the present disclosure.
Figure 8:
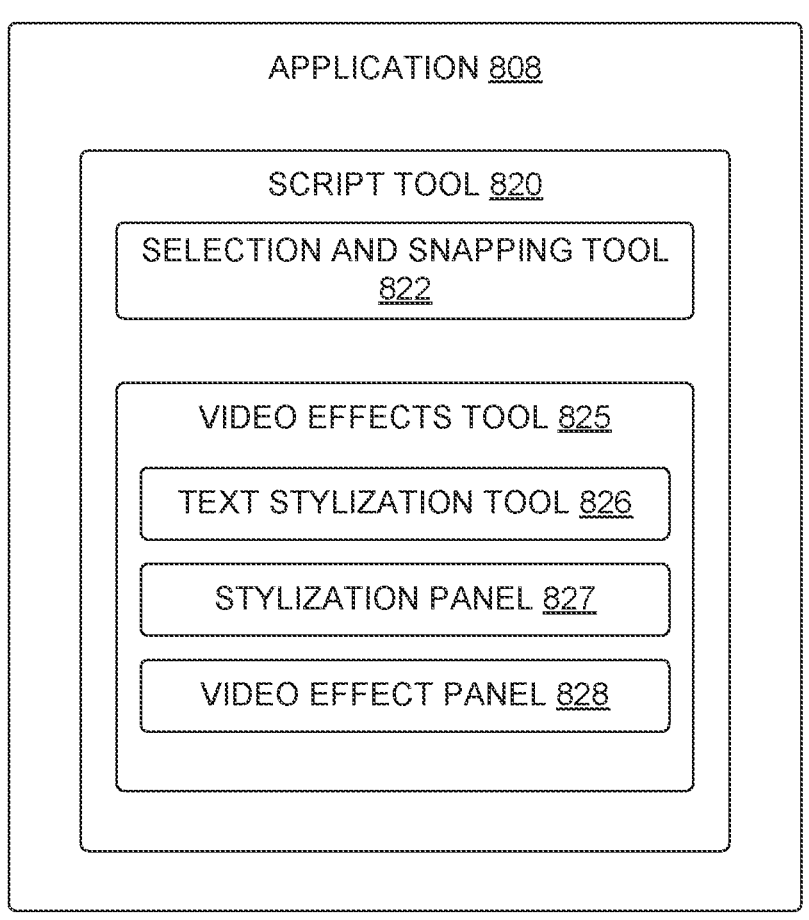

FIG. 8 is a block diagram of an example computing system for script authoring and presentation. In various embodiments, an application 808 provides one or more user interfaces with one or more interaction elements that allow a user to interact with a script and select video effects for display during presentation of the script. For example, the application 808 applies video effects to a video of a presentation of the script by a user. In an embodiment, the application 808 includes a video effect tool 825 which allows the user to select video effects to be applied to the presentation when text segments are spoken during the presentation. Furthermore, in various embodiments, the application 808 includes a script tool 820 that allows users to interact with the script. For example, the script tool 820 allows the user to select text segments and corresponding video effects.

In an embodiment, the script tool 820 includes a selection tool 822 and a video editing tool 825. For example, the selection tool 822 accepts an input selecting sentences, text segments, or words from the script (e.g., by clicking or tapping and dragging across the transcript) and identifies a video. The selection tool 822, in an embodiment, provides the user with the ability to edit the selected text and/or apply video effects to the selected text using the video effects tool 825.

The video effects tool 825, in various embodiments, obtains video effects selections and text segment selections taken from the script and applies the corresponding video effect during presentation. In one example, the video effect tool 825 includes a text stylization tool 826, a stylization panel 827, and a video effect panel 828. In various embodiments, the text stylization tool 826 applies text stylizations or layouts on selected text segments of the script. For example, text stylizations or layouts include, but are not limited to, text stylization or layout (e.g., bold, italic, underline, text color, text background color, numeric list, bullet list, indent text, outdent text), font adjustments (e.g., font type, font size), and styles (e.g., headings, style type).

Furthermore, in some embodiments, the text stylizations or layouts visually represent applied video effects. Interaction mechanisms provided by the video effects tool 825, in some examples, also enable users to explore, discover, and/or modify characteristics (e.g., duration, start point, end point, video effect type) of corresponding video effects through the interactions with the text segments with applied text stylizations or layouts in the script.

In some embodiments, the text stylization tool 826 applies text stylizations or layouts that represent multiple video effects of an effect type being applied on the text segment. For example, a selected text segment can have an applied text stylization mapped to a video effect type, the applied text stylization can represent multiple video effects of the mapped video effect type being applied to the selected text segment when spoken during the presentation. As described, during the script authoring process, for example, upon selection of the text segment, a determination is made as to the video effect associated with the text segment. In an embodiment, additional video effects can also be applied to the same text segment and/or portions of the text segment. In these instances, additional visualizations can be applied to indicate that multiple video effects are being applied on a given text line. For example, these visualizations include different text stylizations or layouts for each applied video effect, respectively. In an embodiment, these additional text stylizations or layouts can be applied to the text segment, with the beginning of the text segment indicating a starting location of the video effect applied to a corresponding portion of the text segment.

In some embodiments, the text stylization tool 826 includes a stylization mapping. The stylization mapping provides a mapping between text stylizations or layouts and video effects and/or video effect types. In one example, the stylization mapping includes a mapping that associates the italics formatting stylization with a particular audio effect. In this example, using an italics stylization on a text segment applies the audio effect to the text segment and/or trigger during presentation. Furthermore, in an embodiment, the stylization mapping allows associations between text stylization and video effects.

In some embodiments, a snapping tool 822 is provided to select and highlight individual words. For example, when highlighting, a user may use the snapping tool 822 to highlight an entire word automatically. In some other examples, snapping occurs to a portion of the word where the snapping tool automatically highlights sections such as half of the word or a quarter of the word. In various embodiments, the text stylization tool 826 utilizes a stylization panel 827 to provide stylization option buttons in the script authoring interface. The stylization options buttons, when selected, apply text stylizations or layouts corresponding to the particular stylization option button. In some embodiments, the stylization buttons includes a visualization of the stylization type (e.g., bold, italic, underline) and a corresponding visualization of video effect (e.g., visual effect, audio effect) mapped to the particular stylization. For example, the stylization panel 827 includes a bold stylization button and, upon selection, applies bolding to a selected text segment while also applying a corresponding visual effect to a preview video. In this example, the stylization button includes a visualization of a bolding indicator (e.g., a bolded uppercase letter B) and a visualization indicating a particular visual effect (e.g., a camera, camera roll, magic wand).

In some embodiments, the text stylization panel 827 includes configurable stylization buttons such that the selection of stylization buttons appearing on the stylization panel 827 are capable of being added, removed, changed, or rearranged to accommodate user preference. For example, an italics stylization button to the left of a bold stylization button and an underline stylization button, the ordering of those stylization buttons are rearrangeable and/or one or all of those stylization buttons are removable.

In various embodiments, the video effect panel 828 provides visualizations of video effects associated with a text stylization. For example, the video effects panel 828 provides video effect options that the user utilizes to adjust and edit a particular video effect. In an embodiment, a text pop-up visual effect includes additional video effect options such as text effects, text visualization effects, color, font type, font size, location, and shadowing effect options. In some embodiments, upon selection of a text stylization, the video effects panel 828 provides visualizations of the video effects and video effect options associated with the selected text stylization. In one example, upon detection of a selection of a text stylization (e.g., an underline) for a particular text segment, the video effects panel 828 provides visualizations of selectable icons and options of the corresponding video effects and video effect options appliable to the particular text segment during presentation.

In some embodiments, the video effects panel 828 provides an "add effects" button for adding an additional video effect of the video effect type to a selected text segment. For example, a text stylization mapped to a visual effect type is appliable to a selected text segment and, upon selection of the "add effects" button, another visual effect is selected and adjusted via the video effects panel 828.

It is noted that FIG. 8 is intended to depict the representative components of an exemplary application 808. In some embodiments, however, individual components may have greater or lesser complexity than as represented in FIG. 8, components other than or in addition to those shown in FIG. 8 may be present, and the number, type, and configuration of such components may vary.

Figure 9:
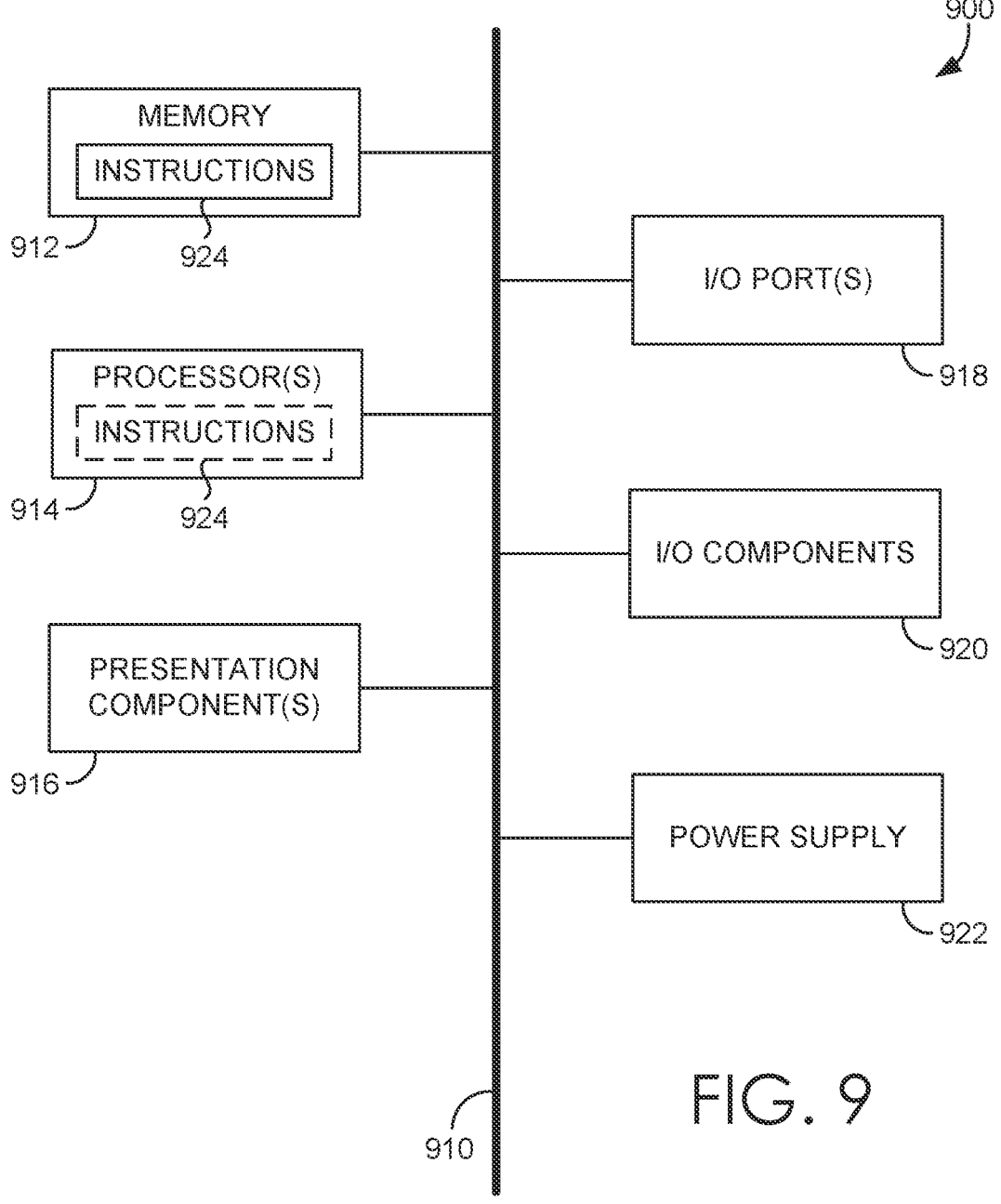
FIG. 9 is a block diagram of an exemplary computing environment suitable for use in implementations of the present disclosure.

Having described embodiments of the present invention, FIG. 9 provides an example of a computing device in which embodiments of the present invention may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present technology. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory 912 can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method comprising:
obtaining a script and a video effect associated with a text segment of the script;
obtaining an audio stream corresponding to a live video stream, the live video stream capturing a live performance of the script by a user using a user device;
determining a portion of the audio stream corresponds to the text segment by at least matching a set of words spoken by the user in the portion of the audio stream to a portion of the text segment of the script;
responsive to determining the portion of the audio stream corresponds to the text segment, causing the video effect to be displayed in the live video stream; and
causing the live video stream including the video effect to be presented to at least one other user device during a real-time presentation.

2. The method of claim 1, wherein the method further comprises advancing a cursor location within a teleprompter displaying the script on the user device based on a location within the script.

3. The method of claim 2, wherein the method further comprises determining the location within the script by at least matching a sliding window including a first plurality of words obtained from the audio stream to a second plurality of words included in the script.

4. The method of claim 3, wherein the sliding window further comprises three words.

5. The method of claim 3, wherein the method further comprises causing a notification to be displayed in a presentation user interface indicating that the location with the script is undetermined based on a second portion of the audio stream and the script.

6. The method of claim 1, wherein the method further comprises causing a script authoring interface to be displayed by a user device enabling a user to provide the script and the video effect to apply to the text segment of the script.

7. The method of claim 6, wherein the method further comprises obtaining, from an input device associated with the user device a set of inputs to the script authoring interface, the set of inputs including at least one of: a set of words to be included in the script, a first selection of the text segment in the script, and a second selection of the video effect to be applied during the live video stream.

8. A non-transitory computer-readable medium storing executable instructions embodied thereon, which, when executed by a processing device, cause the processing device to perform operations comprising:
obtaining a script index corresponding to a script and a video effect to be applied to a video stream in response to a text segment included in the script, the script index including words in the script and location information corresponding to the words in the script, where the video stream captures a user presenting the script;
obtaining an audio stream associated with the video stream;
determining a location within the script based on the script index and a portion of the audio stream by at least matching a first plurality of words within the script to a second plurality of words obtained from the portion of the audio stream; and
applying the video effect to the video stream as a result of the location corresponding to the text segment included in the script.

9. The medium of claim 8, wherein determining the location within the script further comprises advancing a cursor location within a teleprompter indicating the location with a presentation interface.

10. The medium of claim 9, wherein the cursor location further comprises the location information included in the script index corresponding to a word in the script associated with the location.

11. The medium of claim 8, wherein the script index further comprises a key-value store where keys of the key-value store correspond to the location information and values of the key-value store correspond to the words of the script.

12. The medium of claim 8, wherein determining the location within the script further comprises obtaining, from a model, a set of locations and corresponding probabilities, where inputs to the model include the script and a transcript generated based on the audio stream.

13. The medium of claim 8, wherein the computer-readable medium further stores executable instructions that cause the processing device to perform operations comprising:
determining a cadence associated with a user speaking in the audio stream; and
advancing a cursor location within a teleprompter indicating the location with a presentation interface based on the cadence.

14. The medium of claim 8, wherein the location further comprises at least one of a word in the script, a sentence in the script, and a paragraph in the script.

15. A system comprising:

a memory component; and a processing device coupled to the memory component, the processing device to perform operations comprising:

obtaining a script index including a set of words in a script and a set of locations corresponding to words of the set of words in the script;

obtaining a video stream and an audio stream, the video stream and the audio stream are captured by a user device and include a live performance of the script by the user;

determining a location of the set of locations included in the script index based on a portion of the audio stream by at least matching a first subset of words of the set of words in the script to a second set of words extracted from the portion of the audio stream; and as a result of determining the location corresponds to a text segment, applying a video effect to the video stream.

16. The system of claim 15, wherein the script index further comprises a key-value store, wherein locations of the set of locations correspond to keys of the key-value store and words of the set of words correspond to values of the key-value store.

17. The system of claim 16, wherein determining the location further comprises modifying a cursor location to indicate a key of the key-value store associated with the location.

18. The system of claim 17, the processing device further performs operations comprising causing a teleprompter to be updated based on the cursor location.

19. The system of claim 15, wherein determining the location further comprises determining a first set of words obtained from the portion of the audio stream matches a second set of words of the set of words in the script.

20. The medium of claim 8, wherein the second plurality of words are converted from the portion of the audio stream.

* * * * *